(12) United States Patent
Rusten

(10) Patent No.: US 10,528,495 B2
(45) Date of Patent: Jan. 7, 2020

(54) MEMORY WATCH UNIT

(71) Applicant: Nordic Semiconductor ASA, Trondheim (NO)

(72) Inventor: Joar Olai Rusten, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 15/578,666

(22) PCT Filed: Jun. 6, 2016

(86) PCT No.: PCT/GB2016/051661
§ 371 (c)(1),
(2) Date: Nov. 30, 2017

(87) PCT Pub. No.: WO2016/203199
PCT Pub. Date: Dec. 22, 2016

(65) Prior Publication Data

US 2018/0307630 A1    Oct. 25, 2018

(30) Foreign Application Priority Data

Jun. 16, 2015 (GB) .................................. 1510596.8

(51) Int. Cl.
*G06F 13/16* (2006.01)
*G06F 13/24* (2006.01)
*G06F 12/14* (2006.01)

(52) U.S. Cl.
CPC ...... *G06F 13/1668* (2013.01); *G06F 12/1441* (2013.01); *G06F 13/24* (2013.01); *G06F 2212/1052* (2013.01)

(58) Field of Classification Search
CPC .......... G06F 12/08; G06F 13/14; G06F 11/263
(Continued)

(56) References Cited

U.S. PATENT DOCUMENTS 5,579,531 A    11/1996   Sugita
6,243,785 B1    6/2001   Lowe et al.
(Continued)

FOREIGN PATENT DOCUMENTS

EP    0738978 A1    4/1996
EP    0811922 A1    4/1997
(Continued)

OTHER PUBLICATIONS

ARM® Cortex®-M4 Processor, Revision: r0p1, Technical Reference, ©2015 ARM, Manual, 108 pages.
(Continued)

*Primary Examiner* — Getente A Yimer
(74) *Attorney, Agent, or Firm* — Klarquist Sparkman, LLP

(57) ABSTRACT

A microcontroller (1) comprises a processor (2), a memory (3), a bus (15) connecting the processor (2) and the memory (3) and a memory watch unit (14), comprising one or more memory-watch event registers and one or more configuration registers. The memory watch unit (14) is arranged to monitor memory access instructions on the bus (15), and can be configured, using the one or more configuration registers, to (i) detect a memory access instruction for a memory address in a configurable watch region of the memory (3), and (ii) change the contents of one or more memory-watch event registers in response to such a detection.

30 Claims, 1 Drawing Sheet

(58) Field of Classification Search
USPC .......................................................... 710/5
See application file for complete search history.

(56) References Cited

U.S. PATENT DOCUMENTS

| | | | | |
|---|---|---|---|---|
| 7,353,345 | B1* | 4/2008 | Onufryk | G06F 12/0804 |
| | | | | 711/154 |
| 9,087,051 | B2 | 7/2015 | Elahi et al. | |
| 2007/0107056 | A1 | 5/2007 | Frank et al. | |
| 2008/0221708 | A1 | 9/2008 | Oyama et al. | |
| 2008/0258760 | A1 | 10/2008 | Sullam et al. | |
| 2009/0070534 | A1* | 3/2009 | Yu | G06F 12/1441 |
| | | | | 711/146 |
| 2012/0239826 | A1 | 9/2012 | Couvee et al. | |
| 2013/0013107 | A1* | 1/2013 | Felique | G07F 9/00 |
| | | | | 700/244 |
| 2013/0318401 | A1* | 11/2013 | Vera | G06F 11/263 |
| | | | | 714/32 |
| 2014/0266705 | A1* | 9/2014 | McKinley | G08B 25/10 |
| | | | | 340/539.13 |
| 2015/0378412 | A1* | 12/2015 | Suryanarayanan | G06F 1/3206 |
| | | | | 713/340 |

FOREIGN PATENT DOCUMENTS

| | | | |
|---|---|---|---|
| EP | 1988460 | A1 | 4/2008 |
| FR | 2953307 | A1 | 12/2009 |
| GB | 2497528 | A | 6/2013 |
| WO | WO 2001/96979 | A2 | 12/2001 |
| WO | WO 2002/054212 | A2 | 7/2002 |
| WO | WO 2009//077341 | A1 | 6/2009 |
| WO | WO 2011/045678 | A1 | 4/2011 |
| WO | WO 2011/067507 | A1 | 6/2011 |
| WO | WO 2013/088121 | A1 | 6/2013 |
| WO | WO 2013/101188 | A1 | 7/2013 |
| WO | WO 2014/001803 | A2 | 1/2014 |

OTHER PUBLICATIONS

UK Intellectual Property Office, Search Report under Section 17(5) for GB1510596.8, dated Jan. 6, 2016, 4 pages.
Atmel, 8-bit AVR Microcontrollers, Application Note, AVR1001: Getting Started with XMEGA Event System, Atmel-8bit_AVR-Microcontrollers: AVR1001: Getting Started with XMEGA Event System, Rev. 8071A-AVR-02/08, 8 pages.
Energy Micro, EFM32 Peripherals, Peripheral Reflex System, AN0025—Application Note, http://www.engerymicro.com/technology/efm32-peripherals, 2 pages.
Energy Micro, Peripheral Reflex System, AN0025—Application Note; 2011-10-21-an0025_Rev1.02, 17 pages.
PCT International Search Report and Written Opinion for PCT/GB2016/051661, dated Aug. 19, 2016, 59 pages.

* cited by examiner

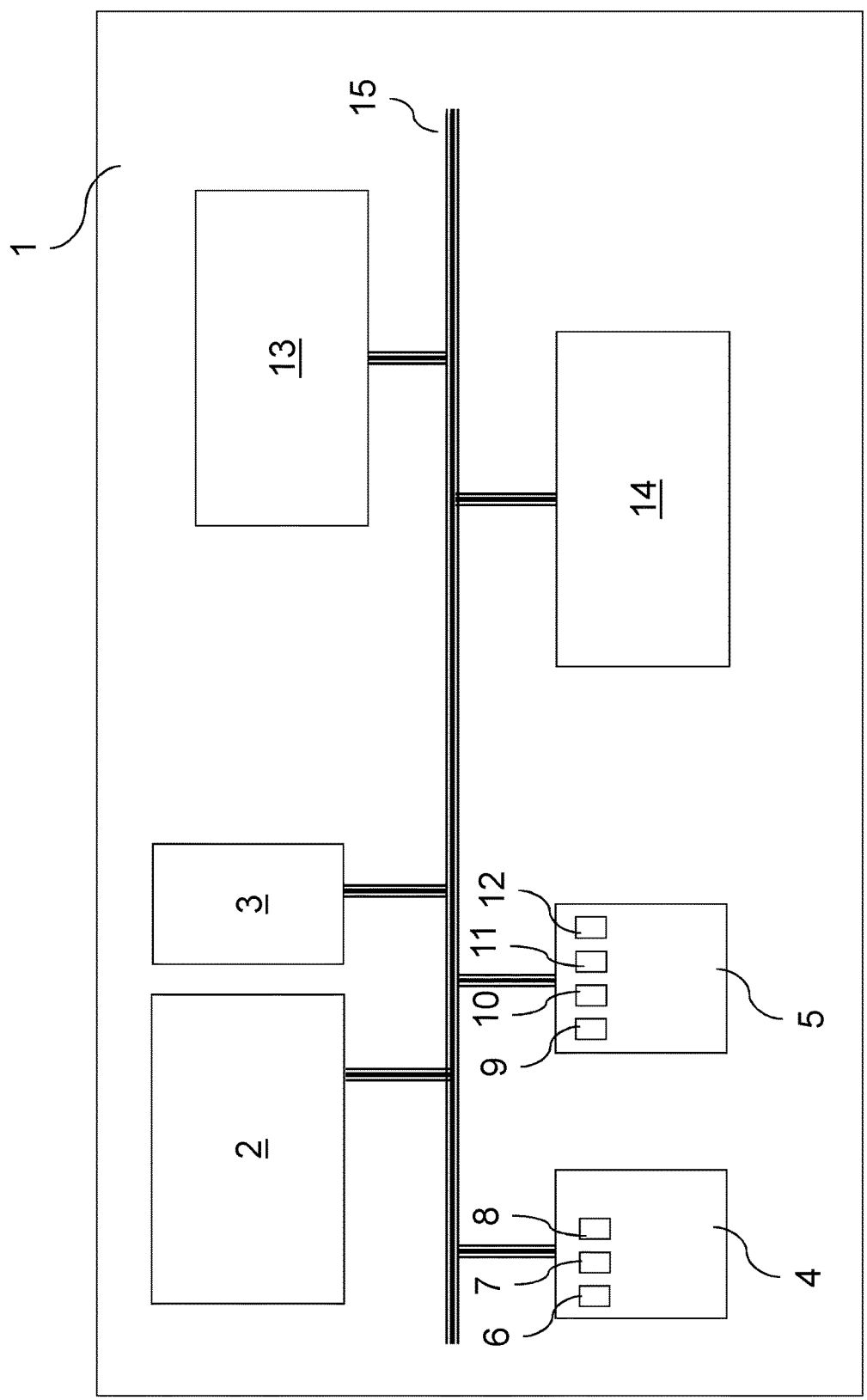

MEMORY WATCH UNIT

CROSS REFERENCE TO RELATED APPLICATIONS

This is the U.S. National Stage of International Application No. PCT/GB2016/051661, filed Jun. 6, 2016, which was published in English under PCT Article 21(2), which in turn claims the benefit of Great Britain Application No. 1510596.8 filed Jun. 16, 2015.

This invention relates to a microcontroller.

It is known for microcontrollers to contain hardware memory protection logic that can prevent a processor from reading and/or writing to a region of memory if appropriate access conditions are not met. For example, WO 2014/001803, by the present applicant, describes memory protection logic that denies read requests for addresses in a protected region of memory if a read protection flag for the protected region is set, unless the processor issued the read requests while executing code stored in the protected region. This can be used to protect firmware code from being accidentally overwritten, or to prevent an attacker from reading sensitive firmware code.

Such memory protection logic is effective, but has a limited number of uses. A more flexible approach would be desirable.

Thus, from a first aspect, the invention provides a microcontroller comprising:
 a processor;
 a memory;
 a bus connecting the processor and the memory; and
 a memory watch unit, comprising one or more memory-watch event registers and one or more configuration registers,
wherein the memory watch unit is arranged to monitor memory access instructions on the bus, and can be configured, using the one or more configuration registers, to (i) detect a memory access instruction for a memory address in a configurable watch region of the memory, and (ii) change the contents of one or more memory-watch event registers in response to such a detection.

It will be seen by those skilled in the art that, in accordance with the invention, the memory watch unit can detect an attempt to access a watch region of memory and can signal this to the rest of the device without necessarily preventing the memory access from occurring, and without necessarily invoking a hard fault. This is more versatile and powerful than prior-art approaches, since it allows a far wider range of responses to be configured, in response to a memory access detection, using software running on the microcontroller.

The processor can preferably configure the memory watch unit by writing to the one or more configuration registers. This will typically be under the control of software being run by the processor. The memory may therefore contain instructions for configuring the memory watch unit. In some embodiments, other devices, such as a peripheral in the microcontroller, may also be able to configure the memory watch unit.

The memory watch unit may comprise a configuration register whose contents determine the type of memory access instruction to be detected. The memory watch unit may, for instance, be configured, based on the contents of the configuration registers, to detect a read instruction, or it may be configured to detect a write instruction, or it may be configured to detect an instruction-fetch instruction, or it may be configured to detect any two or more of these instruction types. It may be configurable to detect one or more other memory-related actions, such as an unaligned access.

The memory watch unit may comprise one or more configuration registers whose contents determine the size or location of the watch region. It may comprise a start-address register, whose contents represent a lower boundary of a range of memory addresses. It may comprise an end-address register, whose contents represent an upper boundary of a range of memory addresses. Alternatively, it may comprise a length register, whose contents represent a size of a range of memory addresses. The memory watch unit may use such a length register in conjunction with a start-address register (or an end-address register) to define the watch region.

The watch region may be a continuous range of memory addresses, although this is not essential, and the memory watch unit may, in some embodiments, allow a more complex watch region to be defined. For instance, in some embodiments the memory may comprise a plurality of predetermined sub-regions (e.g. two, three, ten or more predetermined blocks of memory), with the memory watch unit comprising one or more configuration registers whose contents identify a subset of the sub-regions that together form part or all of the watch region. For example, the memory watch unit may use a bit-field configuration register, in which each bit is associated with a respective one of the sub-regions, and wherein the value of each bit determines whether or not that sub-region is included in the watch region. So, in some embodiments, the memory watch unit can be configured to detect a memory access instruction for a watch region consisting of a subset of the sub-regions, wherein the subset is determined by the contents of one or more of the configuration registers. Depending on the register contents, the subset may be null, or may consist of all of the predetermined sub-regions, or may be a proper subset of the sub-regions.

The watch region may be a single data word long (e.g. given by a single memory address). This would be the case if the same address were written to a start-address register and to an end-address register. However, the memory watch unit is preferably arranged such that the watch region can be configured to comprise at least two memory addresses, and preferably any number of memory addresses.

The memory watch unit may preferably be configured to detect access instructions for memory addresses in a plurality of configurable watch regions—e.g. two, three, ten or more watch regions. It may therefore comprise a plurality of configuration registers, each associated with a different respective watch region. The type or types of access instruction to detect may be configurable independently for each watch region. In some embodiments, the watch regions may be allowed to overlap. This may be useful if, for example, it is desired to configure a read watch for a first region, and a write watch for a second region, overlapping the first region.

The memory watch unit may comprise one or more configuration registers whose contents determine whether a particular watch region is active or inactive; i.e., whether the memory watch unit will detect a memory access instruction for a respective watch region. Each watch region may, for example, be assigned a respective value or bit position, and the presence (or absence) of this value, or a predetermined binary value at the respective bit position, in a configuration register may cause the memory watch unit to detect memory access instructions for that watch region.

The memory watch unit may be arranged to change the contents of the memory-watch event register or registers to indicate for which of a plurality of watch regions a memory access instruction was detected. It may change the contents of the memory-watch event register or registers to indicate what type of access instruction was detected—e.g., read, write or instruction-fetch. A memory-watch event register may comprise a bit-field, with each bit position representing a respective combination of a watch region and an access instruction type. The memory watch unit may then set a respective bit to a predetermined value (e.g. a binary one) when an access instruction is detected. Alternatively, the microcontroller may comprise a plurality of memory-watch event registers, each associated with a different watch region and/or a different type of access instruction.

The memory watch unit is preferably arranged to detect memory access instructions regardless of their origin; i.e. from any bus master. This allows it to be used to detect direct memory access (DMA) instructions from peripherals, for example, as well as instructions from the processor.

Although the configuration and event registers are said to be part of the memory watch unit, it will be appreciated that this does not limit their physical location on the microcontroller. The registers are preferably addressable by the processor, e.g. over the bus. They can preferably be written to and/or read from by the processor. Each register may occupy a contiguous region of memory, or it may be split across a plurality of locations. A register, as referred to herein, may be only a single bit long (possibly within a larger bit field), or it may comprise a plurality of bits (e.g. a 32-bit word).

The memory may comprise volatile and/or non-volatile memory, such as RAM and/or flash memory. A part of the memory may store program code. It is preferably addressable by the processor over the bus.

The processor may be any suitable processor. In some embodiments it is a processor from ARM™, such as a processor from ARM™'s Cortex™ range.

The bus may be an address or instruction bus, or it may carry both instructions and data. The microcontroller may comprise a plurality of buses, such as a processor bus and a peripheral bus. The memory watch unit may be arranged to monitor memory access instructions on a plurality of buses.

The memory watch unit is preferably arranged not to prevent or interfere with the memory access. In particular, it is preferably arranged not to cause a hard fault.

The memory watch unit may, however, comprise one or more configuration registers for configuring the memory watch unit to send an interrupt to the processor when a memory access instruction for a watch region is detected. In this way, the processor can be programmed to prevent the memory access if desired, by an appropriate interrupt handling routine. The interrupt may be a maskable interrupt or a non-maskable interrupt, or there may be separate configuration registers for configuring maskable and non-maskable interrupts.

If an interrupt isn't used, the processor could instead continually poll one or more memory-watch event registers to detect a change in their value. However, this would be inefficient and could prevent the processor from entering a sleep state.

Instead, the microcontroller may comprise a task-triggering unit arranged to respond to the change to the contents of one or more memory-watch event registers by triggering a task (or action) by the processor or by a peripheral on the microcontroller. The task-triggering unit may be configurable by the processor. It may, for example, be configurable to start a timer peripheral, or to stop an SPI transaction, in response to a detection event by the memory watch unit. The task-triggering unit may monitor one or more memory-watch event registers for a change. Alternatively, the memory watch unit may be arranged to send an event signal—e.g. over one or more dedicated signalling lines—when the memory watch unit detects a memory access instruction for a memory address in the configurable watch region of the memory, and the task-triggering unit may be arranged to receive such an event signal. The event signal may identify the event (e.g. which watch region the access instructions was for), or it may cause the task-triggering unit to read one or more of the memory-watch event registers to determine this.

To this end, the microcontroller may comprise a programmable peripheral interconnect—for example, a programmable peripheral interconnect substantially as described in WO 2013/088121, the entire contents of which are hereby incorporated by reference. In some embodiments, the programmable peripheral interconnect is, or can be, programmed to monitor one of the memory-watch event registers. The combination of the memory watch unit and a programmable peripheral interconnect has been found to enable many useful configurations, providing far greater flexibility than a traditional memory protection unit.

The microcontroller preferably comprises at least one peripheral. The peripheral might, for example, be: a timer, a UART, a voltage comparator, an encryption engine, an analogue-to-digital converter (ADC), a digital-to-analogue converter (DAC), a radio transmitter, a radio receiver, etc.

The microcontroller preferably supports memory-mapped input and/or output for the peripheral, e.g. over said bus. The peripheral may be event-generating, being configured to signal an event (e.g. to the processor). The peripheral may comprise an event register, and may be arranged to change the contents of the event register to identify the event. The event register is preferably addressable over the bus. The peripheral may be task-receiving, being configured to respond to a task signal (e.g. from the processor) by performing a task. The peripheral may comprise a task register, associated with the task, and may be configured to perform the task in response to a change in the contents of the task register. The task register is preferably addressable over the bus.

As above, the microcontroller may comprise a programmable peripheral interconnect arranged to access a memory in which a mapping can be stored between a task of a first peripheral and an event of the memory watch unit and/or of a second peripheral. The mapping may comprise (i) the address of a task register associated with the task and (ii) an identification of the event of the memory watch unit and/or of the second peripheral (e.g. an address of a memory-watch event register). The event of the memory watch unit may be associated with a predetermined value in the memory-watch event register, such as a particular bit position in a memory-watch event register being a predetermined value (e.g. a binary one) and/or with the sending of a message over a particular signal line. The programmable peripheral interconnect may be arranged so that, if a mapping is stored in memory between a task of a first peripheral and an event of the memory watch unit (or a second peripheral), the interconnect will provide a channel by sending a task signal to the first peripheral in response to a signal of the event from the memory watch unit (or the second peripheral). The memory watch unit may be arranged to signal a detection event to the programmable peripheral interconnect by sending a message over a signalling line between the memory watch unit and the programmable peripheral interconnect. The message may identify the event (e.g. which watch region and access instruction type was detected), or the programmable peripheral interconnect may be arranged (e.g.

in response to receiving the message) to read one or more of the memory-watch event registers in order to determine the identity of the event (e.g. which watch region and access instruction type was detected). Similarly, the programmable peripheral interconnect may be arranged to send a message over a task signalling line to a peripheral between the two; this message may identify the task, or the programmable peripheral interconnect may read one or more task registers on the peripheral to determine the identity of the task.

In some embodiments, the microcontroller may comprise a protection module, and the task-triggering unit (e.g. a programmable peripheral interface) may be configured to trigger a protection task in response to detecting a predetermined change to the contents of one or more memory-watch event registers. The protection module may be a power module. The protection task may comprise resetting the processor.

The microcontroller is preferably able to monitor memory access instructions while the processor is in a normal execution mode. This is fundamentally different from a data watchpoint, for example, which operates only in debug mode, and which signals only to other debug components in the system (e.g. to halt the processor, or to start trace).

The memory watch unit may set different value or values in one or more memory-watch event registers depending on one or more factors such as what memory access instruction type was detected, or which watch region it was for. There may be a plurality of memory-watch event registers, with a different respective memory-watch event register for each watch region and/or for each access instruction type.

The memory watch unit can be configured to perform a variety of useful operations. By way of example, the memory watch unit may be configured to detect a stack or heap overflow; it may be configured to protect code in the memory from malicious reading or from accidental overwriting; it may be used to debug software code by configuring it to trigger an action (e.g. toggling a GPIO, or generating an interrupt) when a specific register or region of memory is accessed (read or write); or it may be used to ensure the atomic triggering of a task at the exact same time as the processor is writing to or reading from a specific register or memory location.

The microcontroller is preferably an integrated device, although it may, of course, require some off-chip components, such as a crystal, capacitors, etc., in order to operate. These components may be regarded as part of the microcontroller, or they may be regarded as distinct from the microcontroller.

The memory watch unit is preferably a separate hardware module in the microcontroller, distinct from the processor. The memory watch unit may comprise analogue and/or digital components, including transistors, resistors, capacitors, etc., arranged to provide the described functions.

In some embodiments, the microcontroller comprises a radio transceiver. It may be a radio-on-a-chip device.

Features of any aspect or embodiment described herein may, wherever appropriate, be applied to any other aspect or embodiment described herein. Where reference is made to different embodiments or sets of embodiments, it should be understood that these are not necessarily distinct but may overlap.

Certain preferred embodiments of the invention will now be described, by way of example only, with reference to the accompanying drawings, in which FIG. 1 is a schematic drawing showing components of a first system embodying the invention.

FIG. 1 shows an integrated microcontroller device 1. It includes a central processor 2, such as an ARM™ Cortex™-M4. It has memory 3, which comprises both volatile (e.g. SRAM) and non-volatile (e.g. flash) memory. All the memory and registers use a common address space.

The device 1 also has various peripherals. A timer 4 and a UART 5 (universal asynchronous receiver/transmitter) 5 are shown, but it will be appreciated that many other peripherals (not shown) such as a radio, an encryption engine, an analogue-to-digital converter, etc. may also be present.

The timer 4 has an "output" event register 6, an "overflow" event register 7 and an "input" task register 8. The UART 5 has an "RX received" event register 9, a "TX complete" event register 10, an "RX trigger" task register 11 and a "TX trigger" task register 12. These registers share a common memory address space with the memory 3 and can be accessed using memory-mapped I/O by a programmable peripheral interface (PPI) 13 and by the processor 2. Of course, other embodiments may have different peripherals, and the peripherals may have any number of event or task registers.

The programmable peripheral interface (PPI) 13 can be instructed by the processor 2 to establish direct channels between peripherals, such that an event on one peripheral will trigger a task on another peripheral without direct involvement by the processor 2. An example of such a PPI is described in WO 2013/088121. The PPI 13 is configured to poll, periodically, every event register whose address has been written into a special channel-mapping table by the processor 2, and to determine when a value in one of the event registers changes. When a change is detected, the PPI 13 writes an appropriate value to all task registers which are mapped to that particular event register in the channel-mapping table, thereby triggering the appropriate task or tasks.

The device 1 also contains a memory watch unit 14, which is described in more detail below.

A bus 15 connect the various components. The bus 15 may, in some embodiments, comprise two or more different buses, such as an ARM™ Advanced High-Performance Bus and an ARM™ Advanced Peripheral Bus.

The memory watch unit 14 monitors all memory read and write instructions on the bus 15, as well as all instruction fetches. It can be configured, by the processor 2, to generate an event (i) whenever a particular region of memory is read from, or (ii) whenever a particular region of memory is written to, or (iii) whenever a particular region of memory is read from or written to. In some embodiments the watched memory regions may lie anywhere in the memory address space, while in others they may be restricted to certain areas of memory, such as to SRAM and memory segments assigned to peripherals.

The memory watch unit 14 may monitor any number of different regions. In this particular embodiment, it can watch up to fifteen different regions, as follows:

| Memory region | START address | END address |
| --- | --- | --- |
| REGION[0], REGION[1], REGION[2], REGION[3] | configurable | configurable |
| PREGION[0] | 0x40000000 | 0x4001FFFF |
| PREGION[1] | 0x40020000 | 0x4003FFFF |

Each watch region has two main configuration registers—a START register to specify the start address of the region, and an END register to specify the end address of the region. The END register value has to be greater or equal to the START register value. If it is smaller, the operation of the memory watch unit 14 is unpredictable. If the END register value is equal to the START value, the region is one word long relative to the start address. The memory watch unit 14 associates each region with (i) a first event that indicates that a write access inside the region has been detected, and (ii) a second event that indicates that a read access inside the region has been detected.

REGION[0], REGION[1], REGION[2] and REGION[3] can be individually enabled for read and/or write access watching by writing appropriate values to respective bit-flags RGN0RA (read access), RGN0WA (write access), . . . , RGN3RA (read access), RGN3WA (write access) in the REGIONEN (region enable) register.

Unlike the first four regions, the two regions PREGION[0] and PREGION[1] support a sub-region feature, in which the main region is divided into 32 sub-regions of equal size (SR0-SR31), each of which can either be included as part of the region for watching purposes, or excluded from it, according to whether a bit-flag for the sub-region is 1 or 0, respectively, in a 32-bit "SUBS" register for the region. When a sub-region is excluded from the main region, the memory watch mechanism will not trigger any events when that memory region is accessed.

Sub-regions in PREGION[0] and PREGION[1] cannot be individually enabled for read and/or write access watching, but region-wide control is possible for all of the included sub-regions by writing appropriate values to the PRGN0RA (read access watching) and PRGN1WA (write access watching) bit flags in the REGIONEN (region enable) register.

For regions containing sub regions, a set of status registers PERREGION[0].SUBSTATWA, PERREGION[0].SUBSTATRA, PERREGION[1].SUBSTATWA and PERREGION[1].SUBSTATRA indicate which sub-region(s) triggered the latest read or write event.

A register REGIONENSET allows the watching of one or multiple REGIONs or PREGIONs to be enabled in a single write access. A REGIONENCLR register similarly allows the watching of one or multiple REGIONs or PREGIONs to be disabled in a single write access.

The memory watch unit 14 can be instructed, by the processor 2, to generate an interrupt or non-maskable interrupt when access events are detected on particular region or regions. This is done using the INTEN and NMIEN registers. This allows the processor 2 to be made aware of a read or write access without having to poll the event registers continually.

The processor 2 can also set up one or more channels in the PPI 13 using the addresses of event registers in the memory watch unit 14, so that a peripheral task can be triggered automatically (i.e. without processor intervention) when the memory watch unit 14 detects read or write accesses to one or more watched regions.

The following table provides a description of each of the registers associated with the memory watch unit 14:

| Register | Offset | Description |
| --- | --- | --- |
| EVENTS_REGION[0].WA | 0x100 | Signals detection of write access to region 0 |
| EVENTS_REGION[0].RA | 0x104 | Signals detection of read access to region 0 |
| EVENTS_REGION[1].WA | 0x108 | Signals detection of write access to region 1 |
| EVENTS_REGION[1].RA | 0x10C | Signals detection of read access to region 1 |
| EVENTS_REGION[2].WA | 0x110 | Signals detection of write access to region 2 |
| EVENTS_REGION[2].RA | 0x114 | Signals detection of read access to region 2 |
| EVENTS_REGION[3].WA | 0x118 | Signals detection of write access to region 3 |
| EVENTS_REGION[3].RA | 0x11C | Signals detection of read access to region 3 |
| EVENTS_PREGION[0].WA | 0x160 | Signals detection of write access to peripheral region 0 |
| EVENTS_PREGION[0].RA | 0x164 | Signals detection of read access to peripheral region 0 |
| EVENTS_PREGION[1].WA | 0x168 | Signals detection of write access to peripheral region 1 |
| EVENTS_PREGION[1].RA | 0x16C | Signals detection of read access to peripheral region 1 |
| INTEN | 0x300 | Interrupt is enabled on the flagged region(s) in the bit-field |
| INTENSET | 0x304 | Enable interrupt on selected region(s) |
| INTENCLR | 0x308 | Disable interrupt on selected region(s) |
| NMIEN | 0x320 | Non-maskable interrupt is enabled on the flagged region(s) in the bit-field |
| NMIENSET | 0x324 | Enable non-maskable interrupt on selected region(s) |
| NMIENCLR | 0x328 | Disable non-maskable interrupt on selected region(s) |
| PERREGION[0].SUBSTATWA | 0x400 | Indicates which sub-region(s) in region 0 triggered latest write access detection |
| PERREGION[0].SUBSTATRA | 0x404 | Indicates which sub-region(s) in region 0 triggered latest read access detection |
| PERREGION[1].SUBSTATWA | 0x408 | Indicates which sub-region(s) in region 1 triggered latest write access detection |
| PERREGION[1].SUBSTATRA | 0x40C | Indicates which sub-region(s) in region 1 triggered latest read access detection |
| REGIONEN | 0x510 | Read and/or write watching is enabled for selected region(s) |
| REGIONENSET | 0x514 | Enable read/write watching for selected region(s) |
| REGIONENCLR | 0x518 | Disable read/write watching for selected region(s) |
| REGION[0].START | 0x600 | Start address for region 0 |
| REGION[0].END | 0x604 | Length of region 0 |

-continued

| Register | Offset | Description |
| --- | --- | --- |
| REGION[1].START | 0x610 | Start address for region 1 |
| REGION[1].END | 0x614 | Length of region 1 |
| REGION[2].START | 0x620 | Start address for region 2 |
| REGION[2].END | 0x624 | Length of region 2 |
| REGION[3].START | 0x630 | Start address for region 3 |
| REGION[3].END | 0x634 | Length of region 3 |
| PREGION[0].SUBS | 0x6C8 | Bit-field defining which sub-regions of region 0 are included for watching |
| PREGION[1].SUBS | 0x6D8 | Bit-field defining which sub-regions of region 1 are included for watching |

The memory watch unit 14 requires two half clock (HCLK) cycles to detect and generate an event.

The memory watch unit 14 does not prevent the read or write access, but it could be used to trigger a hard fault. This could be done using an appropriate interface provided by the processor 2, or a hard fault could be injected by the processor 2 from within a non-maskable interrupt routine—for example, by the processor 2 reading a specific address that is not mapped to physical memory.

The memory watch unit 14 is arranged to allow an application developer to generate memory access events during development for debugging, and during production execution for failure detection and recovery.

The memory watch unit 14 can be used in many different ways. A few examples are set out in the following paragraphs, but many other uses are also possible.

The processor 2 may configure the memory watch unit 14 to detect stack overflows by defining a watch region that starts at an upper boundary for the call stack, and setting the unit 14 to trigger an interrupt on any attempt to read from or write to the watch region. The same approach may be used to detect heap overflows.

The processor 2 may configure the memory watch unit 14 to protect against accidental overwriting of firmware code by defining a watch region where the firmware is located, and setting the unit 14 to trigger an interrupt on any attempt to write to the firmware region.

The processor 2 may configure the memory watch unit 14 to detect when the timer 4 writes to a capture-compare (CC) register on the timer. If the timer 4 writes to the CC register over the bus 15, then this can be accomplished by monitoring the bus 15. If, however, the timer 4 does not use the bus 15, the memory watch unit 14 might instead monitor the internal register map of the timer 4. Configuring the memory watch unit 14 in this way allows the device 1 to trigger a task at the exact same time as the timer 4 writes to the CC register, thereby enabling atomic operations. If the processor 2 were used instead to trigger the task, the operation would no longer be atomic and an unpredictable delay may be inserted, for example if an interrupt would to arrive after the timer 4 wrote to the CC register but before the processor 2 had triggered the task.

More generally, the processor 2 may configure the memory watch unit 14 to detect write operations to a task register of any peripheral. As well as facilitating atomic operation, this can also be useful for debugging software code. If there is a bug in the code, the memory watch unit 14 can be configured to trigger an operation (toggling a GPIO, or generating an interrupt, etc.) when a specific address is accessed (e.g. when a particular register is written to). If, for example, it is suspected that a register is updated too late, or too early, the memory watch unit 14 and the PPI 13 could be configured to toggle a GPIO when the address is accessed to observe the exact time of the access.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A microcontroller comprising:
    a processor;
    a memory;
    a bus connecting the processor and the memory; and
    a memory watch unit, comprising one or more configuration registers whose contents determine a size or location of a configurable watch region of the memory, wherein:
    the memory watch unit is arranged to monitor memory access instructions on the bus to detect a memory access instruction for a memory address in the configurable watch region of the memory;
    the microcontroller further comprises a task-receiving peripheral and a programmable peripheral interconnect, and a signalling line between the memory watch unit and the programmable peripheral interconnect;
    the memory watch unit is configured to signal a detection event to the programmable peripheral interconnect when the memory watch unit detects a memory access instruction for a memory address in the configurable watch region of the memory, the signalling of the detection event comprising the memory watch unit sending a message over the signalling line between the memory watch unit and the programmable peripheral interconnect;
    the programmable peripheral interconnect is arranged to access a memory in which a mapping can be stored between the detection event signalled by the memory watch unit and a task of the task-receiving peripheral; and
    the programmable peripheral interconnect is arranged, so that, when a mapping is stored between the detection event signalled by the memory watch unit and a task of the task-receiving peripheral, the programmable peripheral interconnect will send a task signal to the task-receiving peripheral in response to the signalling of the detection event by the memory watch unit.

2. The microcontroller of claim 1, wherein the memory contains software instructions for the processor to configure the memory watch unit.

3. The microcontroller of claim 1, wherein the memory comprises a plurality of predetermined sub-regions, and wherein the memory watch unit can be configured to detect a memory access instruction for a watch region consisting of a subset of the sub-regions, wherein the subset is determined by the contents of one or more of the configuration registers.

4. The microcontroller of claim 1, wherein the memory watch unit comprises a configuration register whose contents determine a type of memory access instruction to be detected.

5. The microcontroller of claim 1, wherein the memory watch unit can be configured to detect access instructions for memory addresses in a plurality of configurable watch regions.

6. The microcontroller of claim 5, wherein a type or types of memory access instruction to be detected for each watch region can be configured independently for each watch region.

7. The microcontroller of claim 5, wherein two or more of the watch regions can overlap.

8. The microcontroller of claim 5, wherein the memory watch unit is arranged to change the contents of one or more memory-watch event registers to indicate for which of the plurality of watch regions a memory access instruction was detected.

9. The microcontroller of claim 1, wherein the memory watch unit is arranged to change the contents of one or more memory-watch event registers to indicate what type of access instruction was detected.

10. The microcontroller of claim 1, wherein the memory watch unit comprises a configuration register whose contents determine whether a particular watch region is active or inactive.

11. The microcontroller of claim 1, wherein the memory watch unit is arranged not to prevent or interfere with the memory access.

12. The microcontroller of claim 1, wherein the memory watch unit comprises one or more configuration registers for configuring the memory watch unit to send an interrupt to the processor when a memory access instruction for a watch region is detected.

13. The microcontroller of claim 1, comprising a task-triggering unit arranged to respond to the change to the contents of one or more memory-watch event registers by triggering a task by the processor or by a peripheral on the microcontroller.

14. The microcontroller of claim 1, wherein the memory watch unit is configured to detect a memory access instruction for an address adjacent a predetermined boundary for a stack or heap area of the memory.

15. The microcontroller of claim 1, wherein the memory watch unit is configured to detect a memory access instruction for an address in a region of the memory containing firmware for the microcontroller.

16. A microcontroller comprising:
a processor;
a memory;
a bus connecting the processor and the memory; and
a memory watch unit, comprising one or more memory-watch event registers, and comprising one or more configuration registers whose contents determine a size or location of a configurable watch region of the memory,
wherein:
the memory watch unit is arranged to monitor memory access instructions on the bus to (i) detect a memory access instruction for a memory address in the configurable watch region of the memory, and (ii) change the contents of one or more memory-watch event registers in response to such a detection;
the microcontroller further comprises a task-receiving peripheral and a programmable peripheral interconnect;
the programmable peripheral interconnect is programmed to receive a signal of a detection event from the memory watch unit by monitoring one or more of said one or more memory-watch event registers, and is arranged to access a memory in which a mapping can be stored between the detection event signalled by the memory watch unit and a task of the task-receiving peripheral; and
the programmable peripheral interconnect is arranged, so that, when a mapping is stored between the detection event signalled by the memory watch unit and a task of the task-receiving peripheral, the programmable peripheral interconnect will send a task signal to the task-receiving peripheral in response to the signalling of the detection event by the memory watch unit.

17. The microcontroller of claim 16, wherein the memory contains software instructions for the processor to configure the memory watch unit.

18. The microcontroller of claim 16, wherein the memory comprises a plurality of predetermined sub-regions, and wherein the memory watch unit can be configured to detect a memory access instruction for a watch region consisting of a subset of the sub-regions, wherein the subset is determined by the contents of one or more of the configuration registers.

19. The microcontroller of claim 16, wherein the memory watch unit comprises a configuration register whose contents determine a type of memory access instruction to be detected.

20. The microcontroller of claim 16, wherein the memory watch unit can be configured to detect access instructions for memory addresses in a plurality of configurable watch regions.

21. The microcontroller of claim 20, wherein a type or types of memory access instruction to be detected for each watch region can be configured independently for each watch region.

22. The microcontroller of claim 20, wherein two or more of the watch regions can overlap.

23. The microcontroller of claim 20, wherein the memory watch unit is arranged to change the contents of one or more memory-watch event registers to indicate for which of the plurality of watch regions a memory access instruction was detected.

24. The microcontroller of claim 16, wherein the memory watch unit is arranged to change the contents of one or more memory-watch event registers to indicate what type of access instruction was detected.

25. The microcontroller of claim 16, wherein the memory watch unit comprises a configuration register whose contents determine whether a particular watch region is active or inactive.

26. The microcontroller of claim 16, wherein the memory watch unit is arranged not to prevent or interfere with the memory access.

27. The microcontroller of claim 16, wherein the memory watch unit comprises one or more configuration registers for configuring the memory watch unit to send an interrupt to the processor when a memory access instruction for a watch region is detected.

28. The microcontroller of claim 16, comprising a task-triggering unit arranged to respond to the change to the contents of one or more memory-watch event registers by triggering a task by the processor or by a peripheral on the microcontroller.

29. The microcontroller of claim 16, wherein the memory watch unit is configured to detect a memory access instruction for an address adjacent a predetermined boundary for a stack or heap area of the memory.

30. The microcontroller of claim 16, wherein the memory watch unit is configured to detect a memory access instruction for an address in a region of the memory containing firmware for the microcontroller.

* * * * *